United States Patent [19]
Kuhlman

[11] Patent Number: 5,873,300
[45] Date of Patent: Feb. 23, 1999

[54] APPARATUS FOR HEATING FOOD

[76] Inventor: Delmar A. Kuhlman, 208 S. Bleckley Dr., Wichita, Kans. 67208

[21] Appl. No.: 871,929

[22] Filed: Jun. 10, 1997

[51] Int. Cl.$^6$ .................................................. A47J 36/26
[52] U.S. Cl. ................................ 99/447; 99/422; 126/390
[58] Field of Search .............................. 99/401, 422, 447, 99/446; 126/390, 19 R

[56] References Cited

U.S. PATENT DOCUMENTS

| | | |
|---|---|---|
| 1,178,298 | 4/1916 | Carlton ........................................ 99/447 |
| 1,563,823 | 12/1925 | Anderson . |
| 1,685,829 | 10/1928 | Sauvage . |
| 2,342,692 | 2/1944 | Rehm ..................................... 99/422 X |
| 3,386,433 | 6/1968 | Copeland . |
| 4,332,188 | 6/1982 | Rhear . |
| 4,378,729 | 4/1983 | Pierick . |
| 4,384,513 | 5/1983 | Pierick . |
| 4,570,610 | 2/1986 | Himmel . |
| 4,640,265 | 2/1987 | Romo . |
| 4,867,050 | 9/1989 | Patenaude et al. .................... 99/447 X |
| 5,206,045 | 4/1993 | Stuck . |
| 5,313,877 | 5/1994 | Holland ................................. 99/447 X |
| 5,315,922 | 5/1994 | Keller . |
| 5,351,068 | 9/1994 | Muchin . |
| 5,365,833 | 11/1994 | Chen . |
| 5,431,091 | 7/1995 | Couture ................................. 99/447 X |
| 5,467,695 | 11/1995 | Keller . |
| 5,503,063 | 4/1996 | Sebald . |
| 5,523,104 | 6/1996 | Kirk . |

FOREIGN PATENT DOCUMENTS

| | | |
|---|---|---|
| 666154 | 12/1925 | Germany . |
| 673-572 | 3/1990 | Switzerland . |

*Primary Examiner*—Reginald L. Alexander
*Attorney, Agent, or Firm*—Shook, Hardy & Bacon

[57] ABSTRACT

An apparatus for heating food is provided which is comprised of a heat distributing device, a base upon which the device rests, a heat source underneath the device, and a lid resting on the base and covering the device. The device is comprised of a heat conductive element presenting a surface for receiving food and a heat distributing concave shield coupled to the element and defining an air cavity under a substantial portion of the element. This apparatus may be used to keep food warm, moist, and/or crisp for hours.

19 Claims, 2 Drawing Sheets

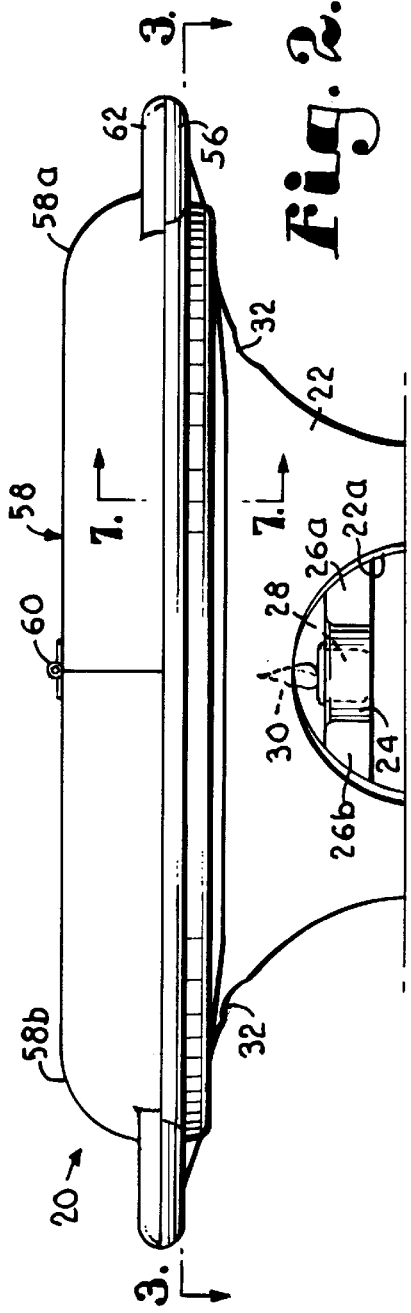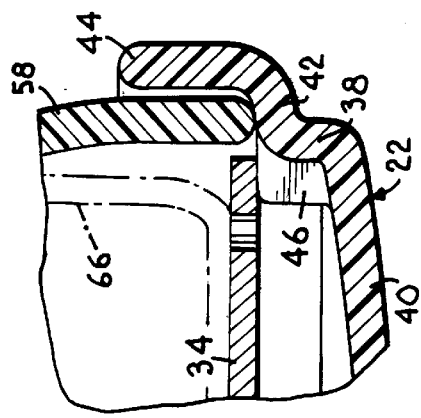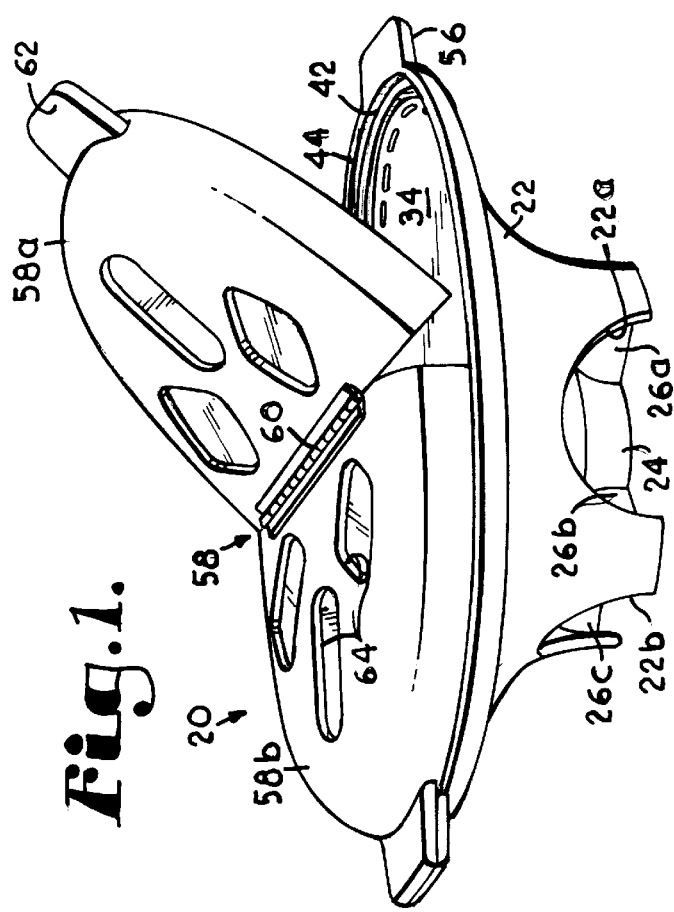

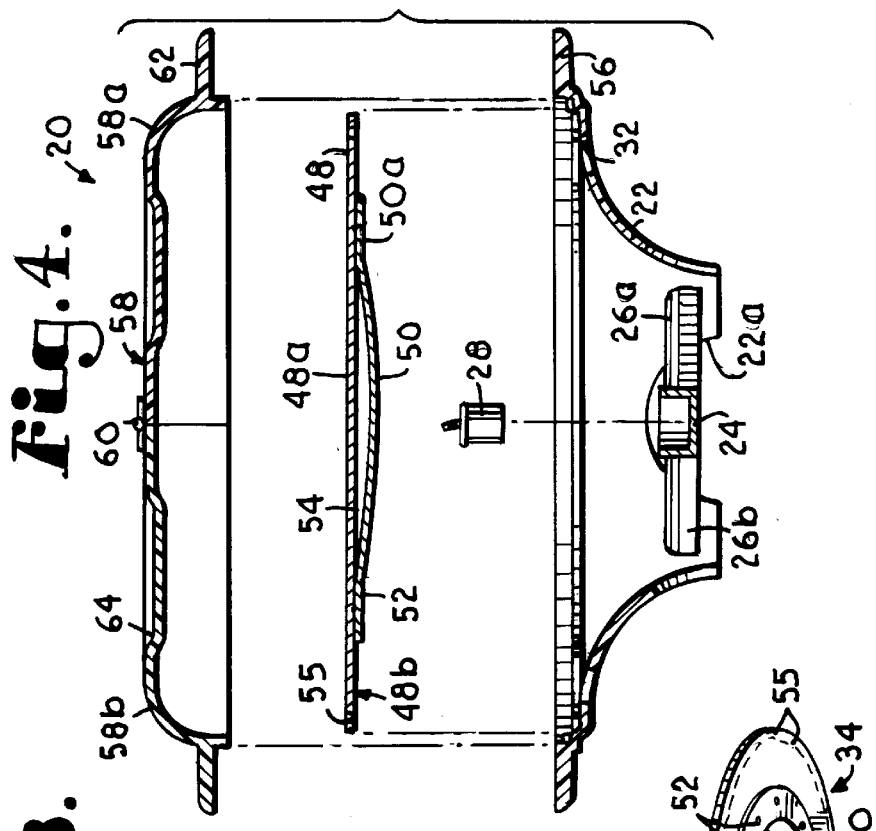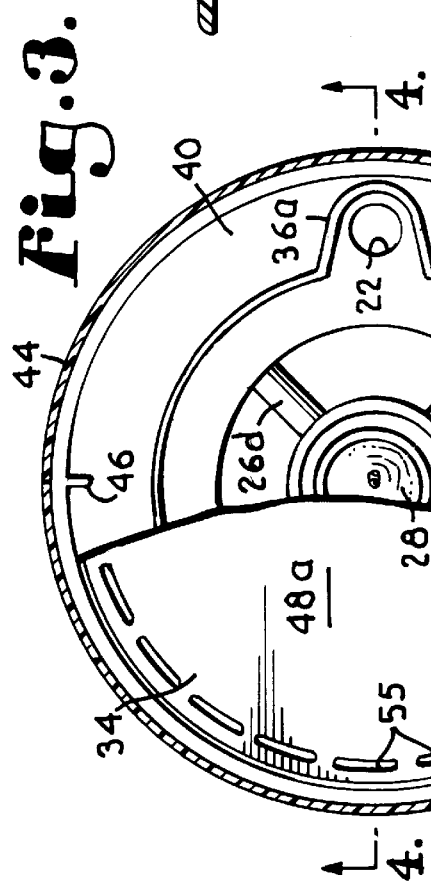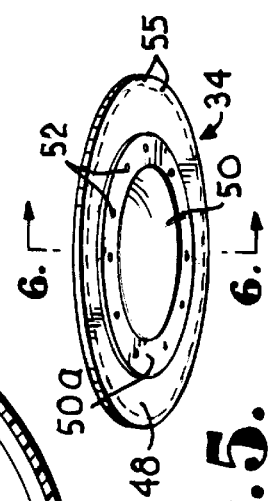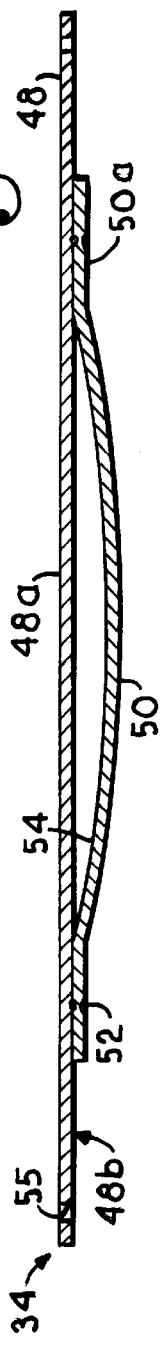

APPARATUS FOR HEATING FOOD

BACKGROUND OF THE INVENTION

The present invention relates to an apparatus for heating food. More specifically, the present invention relates to an apparatus that evenly and efficiently heats food through the use of a low cost heat source such as a candle or the like.

Once food is taken out of the oven or off the stove, it is desirable to keep it warm throughout a meal, party or other event where the food is eaten gradually over a period of time. While hot foods may be served on plates or platters, they quickly lose heat when sitting at room temperature. In addition, foods which are set out in the open tend to dry out. Furthermore, if the food remaining on the plate or platter is reheated in a microwave, it becomes soggy and has an undesirable texture.

An electric skillet may be used to keep food warm throughout a meal, party or other event. However, food may be overcooked and even burned if left in an electric skillet. Furthermore, since an electric skillet requires an electrical outlet, it is only somewhat portable. In addition, one may trip on its cord causing it to be knocked off a table or other surface.

Commercial buffets have used metal serving dishes placed over a canned fuel source such as is marketed under the trade name STERNO. However, such a device does not insure even heating throughout the metal dish without stirring. Furthermore, the metal lids on these serving dishes are hot and thus are usually left open. Commercial buffets have also used chafing dishes which try to insure even heating through the use of a heated water pan placed underneath a metal dish containing food. These water pans are difficult to set up and further often create spillage, splattering and sanitation problems.

Other devices have also been suggested which use air flow to distribute heat throughout the flat bottom of a warming surface. However, much of the heat in such devices is wasted because it dissipates into the surrounding air.

An apparatus is needed which is able to evenly and effectively heat food. Further, a fully portable apparatus not dependent on an electrical power source is needed which can be placed safely on any table top. Still further, an apparatus is needed which is able to keep food warm without burning it or causing hot spots and which utilizes an efficient and economical heat source.

SUMMARY OF THE INVENTION

It is an object of the present invention to provide a portable food warming apparatus which evenly distributes heat over a wide surface.

A further object of the present invention is to provide a food warming apparatus which can be placed safely on any tabletop.

Another object of this invention is to provide a device for warming food without burning it or causing hot spots.

Still a further object of the present invention is to provide an apparatus meeting the foregoing objects which has a split lid so as to prevent excessive heat loss when removing a portion of the food being heated.

An additional object of the present invention is to provide a warming apparatus that utilizes an efficient and economical heat source.

Another object of the present invention is to provide a food warming apparatus having a cavity of air underneath the heating surface to help distribute heat over a wide area.

Still another object of the present invention is to provide an apparatus as described in the foregoing objects which has an inner shelf for catching liquid which drains from the food being heated.

A further object of this invention is to provide an apparatus which may be used to keep pizza hot and which keeps pizza crust crisp and the toppings on the pizza moist for hours.

According to the present invention, the foregoing and other objects are achieved by an apparatus for heating food which includes a base, a heat source, a heat distributing device, and a lid. The device is comprised of a heat conductive element presenting a surface for receiving food and a heat distributing concave shield coupled with said element to define an air cavity between said shield and said element. The shield helps to evenly distribute heat from the heat source to the element. This device rests on the base and the heat source is placed underneath it. The lid rests on the base and covers the device.

BRIEF DESCRIPTION OF THE DRAWINGS

The attached drawings are included as part of the specification and are to be read in conjunction with the specification. Like reference numerals are used to indicate like parts in various views.

FIG. 1 is a top perspective view of the apparatus of the present invention with one of the lid sections raised so that the apparatus is partially open;

FIG. 2 is a front elevational view of the apparatus shown in FIG. 1;

FIG. 3 is a horizontal cross-sectional view taken generally along line 3—3 of FIG. 2 with parts being broken away to reveal details of construction;

FIG. 4 is an exploded vertical cross-sectional view taken generally along line 4—4 of FIG. 3;

FIG. 5 is a bottom perspective view of the heat distributing device which is used in the apparatus;

FIG. 6 is an enlarged vertical cross-sectional view taken generally along line 6—6 of FIG. 5; and FIG. 7 is an enlarged vertical cross-sectional view taken generally along line 7—7 of FIG. 2.

DETAILED DESCRIPTION OF THE PREFERRED EMBODIMENTS

An apparatus for heating food embodying the principles of this invention is broadly designated in the drawings by reference numeral 20 and is shown in its entirety in FIG. 1, FIG. 2, and FIG. 4. Apparatus 20 is primarily comprised of a base 22, a heat distributing device 34, a lid 58 and a heat source 28. Specifically, base 22 has side openings 22a and 22b and is coupled with heat source holder 24 by bars 26a–d, shown in FIGS. 1–4. Two other openings identical to 22a and 22b are not shown. As shown in FIG. 2, heat source holder 24 holds candle 28 having flame 30.

Base 22 has finger holes 32 for removing heat distributing device 34 from base 22. As shown in FIG. 3, base 22 has an inner rim 36 and a side 38 which define the inner lower shelf 40 of base 22. Inner rim 36 is configured with curve 36a so as to define inner lower shelf 40 as not including finger holes 32 within inner lower shelf 40. Upper shelf 42 extends from side 38 in a horizontal direction as shown in FIG. 7. Outer rim 44 of base 22 vertically extends from upper shelf 42 as also shown in FIG. 7.

Projections 46 shown in FIGS. 3 and 7 extend from side 38 of base 22, and heat distributing device 34 rests upon projections 46, as shown in FIG. 7. Heat distributing device 34 is shown in FIG. 5 and FIG. 6. It is comprised of heat conductive element 48 and heat distributing concave shield 50. Element 48 has a surface for receiving food 48a and an opposite surface 48b. Element 48 may have vents 55 around its outer perimeter. Shield 50 has a flat band 50a at its perimeter. Band 50a is spot welded to surface 48b of element 48 as represented by numeral 52. This welded device forms cavity 54 which helps in distributing heat evenly across element 48.

Base 22 has two handles 56 extending from outer rim 44 of base 22. As shown in FIGS. 1, 2 and 4, lid 58 rests upon upper shelf 42 of base 22, and outer rim 44 prevents lid 58 from sliding off base 22. Lid 58 is comprised of two lid sections 58a and 58b held together by hinge 60. Both lid sections 58a and 58b have a handle 62. Lid 58 further has indentations 64 as shown in FIGS. 1 and 4, which provide it with additional strength.

Base 22 is preferably made of a material which is durable in the presence of heat and remains cool while the apparatus is in use. Most preferably, base 22 is made of a commercial grade, high impact resin. Heat distributing device 34 is comprised of a material which conducts heat. Preferably, this apparatus is made of a heat conductive metal such as aluminum. Lid 58 is made of a material which does not conduct heat such as plastic, and hinge 60 may be made of metal, plastic or any other suitable material. Preferably, lid 58 is transparent, and hinge 60 is built into the mold of lid 58.

In operation, a heat source, such as candle 28, is activated and set in heat source holder 24. The heat source used with this apparatus may be a candle, canned fuel (such as STERNO), oil lamp or other fuel. Side openings 22a and 22b of base 22 allow oxygen to travel to the heat source.

Heat distributing device 34 is placed to rest on projections 46 of base 22 after the heat source is activated. Preferably, base 22 has at least three projections 46. Device 34 is comprised of concave shield 50 and element 48. Preferably, element 48 has vents 55 around its outer perimeter which allow excess heat to escape from base 22 and act to further warm the top surface of food placed on element 48 by creating a warm area under lid 58. Shield 50 is centered when its peripheral band 50a is coupled with element 48, and candle 28 or other heat source is immediately underneath the lowest point of shield 50. Shield 50, while preferably concave in shape, may instead be conical, box-shaped, or any other shape which is able to aid in defining a cavity. Preferably, heat conductive element 48 and heat distributing concave shield 50 are spot welded together. The advantage of spot welding is that it leaves openings allowing moisture which accumulates within cavity 54 to evaporate into the air. In the alternative, shield 50 may be coupled to element 48 by solid welding or other means, and several small openings could be made in the concave shield to facilitate the draining of any condensed moisture which accumulates within the cavity. It has been found acceptable for element 48 to be a disk which is 14 inches in diameter and concave shield 50 to be circular and 10 inches in diameter with the actual concave part of the shield being 7 inches in diameter and the peripheral band 50a which contacts the disk being 1½ inches in width.

Shield 50 allows device 34 to evenly distribute heat from a single heat source by transferring heat outwardly around the concave shield and then both inwardly and outwardly from where band 50a of concave shield 50 meets element 48. Meanwhile, the air in cavity 54 is heated and heat is thus transferred to the center of element 48. The construction of shield 50 is such that it absorbs 97% of the energy from the heat source, and element 48 can maintain an even temperature of 160° F. for several hours.

Base 22 may have one or a plurality of finger holes 32 for removing heat distributing device 34. Preferably, it has two finger holes 32 as shown in FIG. 2 and FIG. 4. Finger holes 32 are preferably 1½ inches in diameter and are placed below handle 56 of base 22 approximately 1 inch from outer rim 44. By pushing upwardly through finger hole 32, device 34 is easily removed from base 22. Base 22 also has an inner lower shelf 40 defined by inner rim 36 and side 38 which catches grease or other liquid which may drain from the food being heated. Inner rim 36 is configured so as not to include finger holes 32 within inner lower shelf 40 so that liquid does not drain through the finger holes.

Lid 58 is placed over device 34 and rests upon upper shelf 42 of base 22 and is kept from slipping by outer rim 44. Preferably, lid 58 is slightly oval or oblong in shape rather than being perfectly circular. Such a shape allows one lid section to be opened and closed without having the corners of the lid section hit the outer rim of the base while being raised and lowered.

In an alternate embodiment, an all-purpose chafing dish may be created with this apparatus by setting a standard baking pan 66 on element 48 as shown by the dotted lines in FIG. 7. As a chafing dish, this apparatus can keep any food warm such as bread, vegetables or any liquid or semi-liquid food. In this embodiment, lid sections 58a and 58b will be taller to accommodate baking pan 66. In addition, lid sections 58a and 58b may each have a support bar extending down along the straight hinged edge to lend extra support to the lid and prevent any sagging. Upper shelf 42 of base 22 will be higher when accommodating a baking pan and the three projections 46 that apparatus 34 rests upon will be lowered. Upper shelf 42 will also be extended outwardly so as to increase the diameter of base 22 and allow the rim of the baking pan to fit under lid 58.

The apparatus of the present invention may be used as a holding tray for grilled meats, a serving container for hot hors d'oeuvres or pizza, an all-purpose chafing dish, or can be used to thaw frozen foods without cooking them. This apparatus may be used at tailgate parties, picnics, outdoor Bar-B-Q's, or indoor gatherings.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

I claim:

1. An apparatus for heating food, comprising:
   a base;
   a heat conductive element which rests on said base presenting a surface for receiving food and an opposite surface; and
   a heat distributing shield coupled to said opposite surface of said element by a peripheral band that transfers heat evenly to said element, wherein said shield cooperates with said element to define an air cavity between said shield and said opposite surface of said element.

2. An apparatus as in claim 1 wherein said element is circular in shape.

3. An apparatus as in claim 1 wherein said shield is concave and circular.

4. An apparatus as in claim 1 wherein said shield is coupled to said element only along a peripheral band of said shield.

5. An apparatus as in claim 1, further comprising:
a heat source underneath said shield and surrounded by said base.

6. An apparatus as in claim 1, further comprising:
a lid received by said base and covering said heat conductive element.

7. An apparatus as in claim 1 wherein said element has at least one vent near its perimeter.

8. An apparatus as in claim 1 wherein said element has a plurality of vents near its perimeter.

9. An apparatus for heating food, comprising:
a base;
a heat conductive element which rests on said base presenting a surface for receiving food and an opposite surface;
a heat distributing shield coupled to said opposite surface of said element and cooperating with said element to define an air cavity between said shield and said opposite surface of said element; and
a lid received by said base and covering said heat conductive element wherein said lid is comprised of two sections allowing a section of said lid to be raised while the other section of said lid is in contact with said base.

10. An apparatus as in claim 9 wherein said lid is slightly oval in shape.

11. An apparatus as in claim 1 wherein said base has at least one finger hole to facilitate removing said heat conductive element from said base.

12. An apparatus as in claim 1 wherein said base has an inner rim and a side which define a lower inner shelf for collecting liquid which drains from the food being warmed.

13. An apparatus as in claim 1 wherein said base includes means for catching liquid from food set on said element.

14. A device which distributes heat, comprising:
a heat conductive element presenting a surface for receiving food and an opposite surface; and
a heat distributing shield coupled to said opposite surface of said element by a peripheral band that transfers heat evenly to said element, wherein said shield cooperates with said element to define an air cavity between said shield and said opposite surface of said element.

15. A device as in claim 14 wherein said element is circular in shape.

16. A device as in claim 14 wherein said shield is concave and circular.

17. A device as in claim 14 wherein said shield is coupled to said element only along a peripheral band of said shield.

18. An apparatus as in claim 14 wherein said shield is spot welded to said element.

19. An apparatus for heating food, comprising:
a base having at least one finger hole and having an inner rim and a side which define a lower inner shelf;
a heat conductive element which rests on said base presenting a surface for receiving food and an opposite surface wherein said element has a plurality of vents near its perimeter;
a heat distributing concave shield coupled to said opposite surface of said element and cooperating with said element to define an air cavity between said shield and said opposite surface of said element;
a heat source underneath said shield and surrounded by said base; and
a lid received by said base and covering said heat conductive element wherein said lid is comprised of two sections allowing a section of said lid to be raised while the other section of said lid is in contact with said base.

\* \* \* \* \*